United States Patent [19]

Hamma et al.

[11] 4,075,841
[45] Feb. 28, 1978

[54] CONTROL SYSTEM FOR HYDROSTATIC TRANSMISSION

[75] Inventors: Karlmann Hamma, Tettnang; Willy Holdenried, Immenstaad, both of Germany

[73] Assignee: Zahnradfabrik Friedrichshafen AG, Friedrichshafen, Germany

[21] Appl. No.: 759,270

[22] Filed: Jan. 14, 1977

[30] Foreign Application Priority Data

Jan. 14, 1976 Germany ............................ 2601226

[51] Int. Cl.$^2$ ............................................ F16H 39/46
[52] U.S. Cl. ........................................ 60/444; 60/447; 60/449; 60/465
[58] Field of Search ................. 60/444, 445, 447, 449, 60/465; 80/66 R

[56] References Cited

U.S. PATENT DOCUMENTS

| | | | |
|---|---|---|---|
| 3,572,213 | 3/1971 | Lauck | 60/449 X |
| 3,772,888 | 11/1973 | Orlando | 60/444 |
| 3,783,611 | 1/1974 | Bojas | 60/445 X |
| 3,999,387 | 12/1976 | Knopf | 60/465 X |

*Primary Examiner*—Edgar W. Geoghegan

*Attorney, Agent, or Firm*—Karl F. Ross

[57] ABSTRACT

A system for controlling the operation of a reversible hydrostatic transmission including an engine-driven pump, particularly for a self-propelled utility vehicle such as a forklift truck, comprises a switchover member coupled with a setting lever of the hydrostatic pump which is biased by a pair of counteracting springs into a normal centered position. A shift lever, upon being moved from "neutral" to "forward" or "reverse", causes a displacement of the switchover member into a corresponding off-normal position by a fluidic or electromagnetic directive force generally proportional to engine speed. At a speed exceeding a certain limit in either direction, the switchover member deactivates the fluidic or electric operating circuit for the opposite direction whereby a shift from "forward" to "reverse", or vice versa, will let a change in direction take place only after the switchover member has been restored to near-normal exclusively by its biasing springs against the gradually decaying directive force previously applied. A pedal-operated linkage, coupled with the switchover member, serves for a rapid restoration of that member to normal or for fine speed control at near-zero velocities.

12 Claims, 8 Drawing Figures

CONTROL SYSTEM FOR HYDROSTATIC TRANSMISSION

FIELD OF THE INVENTION

Our present invention relates to a system for controlling the operation of a reversible hydrostatic transmission as used, for example, in a self-propelled utility vehicle such as a forklift truck.

BACKGROUND OF THE INVENTION

A transmission of the type here envisaged comprises a hydrostatic pump fluidically linked with a hydrostatic motor whose sense of rotation can be varied by changing the position of a tiltable control plate within the pump. When the tilt angle of this plate is zero, i.e. when the plate is perpendicular to the axis of rotation, the motor is positively arrested.

The continuous adjustability of hydrostatic transmissions from high forward torques through standstill to high reverse torques, at speeds determined by that of a prime mover driving the pump, makes such transmissions eminently suitable for use in forklift trucks and similar vehicles designed for the transportation of heavy cargoes across factory yards or warehouse floors.

When the driver of a loaded vehicle of this type reverses a shift lever to change direction while the vehicle is moving at high speed, the cargo is liable to slide off its fork, platform or other support as the vehicle comes sharply to a stop before reversing its course. In order to prevent such mishaps, it has already been proposed to displace the control plate of the engine-driven hydrostatic pump with the aid of a switchover piston in an ancillary cylinder which is hydraulically shifted into either of two operating positions under the control of a selector lever by way of throttled conduits preventing rapid reversals. Reference may be made in this connection to an article by F. S. Glaser and H. Nikolaus, entitled "Auslegung hydrostatischer Fahrantriebe fuer Arbeitsmaschinen", published in the periodical "Oelhydraulik und Pneumatik", 1973, No. 3; see especially FIG. 22 of that article. The throttling of the oil flow in such a control system minimizes the risk of significant cargo shifts on the vehicle but delays the buildup of sufficient pressure from the engine-driven pump to accelerate the vehicle in the opposite direction.

OBJECTS OF THE INVENTION

The general object of our present invention, therefore, is to provide an improved control system for a reversible hydrostatic transmission which combines the advantage of gradual stopping after high-speed operation with the possibility of rapid acceleration in either direction after the vehicle or other load driven through the transmission has come to a near or complete halt.

A related object is to provide means in such a system for allowing the operator to stop or to slow down the hydrostatic load motor independently of the delayed response of the ancillary piston or other switchover member to a change in the position of a selector lever.

Another object, allied with the preceding one, is to provide highly sensitive manual control means for establishing near-zero load speeds independent of engine speed.

SUMMARY OF THE INVENTION

In accordance with our present invention, a switchover member mechanically linked with setting means on the engine-driven hydrostatic pump (designed to adjust the tilt of its control plate) is urged by associated biasing means into a normal position coinciding with zero torque transmission to the hydrostatic motor; this member can be shifted to one or the other side of its normal position by a directive force exerted on it upon the energization of first or second actuating means operatively coupled therewith, such energization being brought about by the movement of a selector from a neutral position to a corresponding working position. When the applied directive force has displaced the switchover member by a predetermined minimum distance from its normal position, energization of the hitherto de-energized actuating means by a change of the selector to its alternate working position is prevented by inhibiting means effective upon such displacement to delay a change in sign of the transmitted torque until after a reverse displacement of the switchover member by its biasing means.

The directive force exerted upon the switchover member by the first or the second actuating means is preferably fluidic, more specifically hydraulic, even though electromagnetic energy can also be used. Advantageously, this directive force is at least roughly proportional to engine speed — and thus also to the velocity of the vehicle — by being derived from an energy source linked with the engine-driven hydrostatic pump. This energy source is part of a fluidic or electric supply circuit which, pursuant to a further feature of our invention, includes preferably adjustable delay means lying in series with that actuating means which is energized in a working position of the selector, thereby maintaining a gradually diminishing energization of the hitherto operative actuating means upon a changeover of the selector to its other working position.

In principle, the aforedescribed and other features of our invention are applicable to an unsymmetrical system in which the energization of only one actuating means, e.g. the actuating means controlling reverse driving of a vehicle, is temporarily prevented by the inhibiting means while the other actuating means is operative. In most instances, however, it will be desirable to have a substantially symmetrical system designed to retard deceleration from high speeds in either direction, even though the critical speed levels activating the inhibiting means need not be the same in both driving directions. In a hydraulic or pneumatic control system as more particularly described hereinafter, the inhibiting means may take the form of lands on a piston, acting as the switchover member, and on its cylinder or on a stationary insert therein becoming effective after a certain piston stroke from a normal piston position to unblock a normally blocked venting port of a fluid chamber in one half of the cylinder whose other half has a similar fluid chamber then under pressure. By shifting the normal piston position with the aid of suitable adjusting means, we may vary the relative stiffness of two counteracting biasing springs bearing upon the piston and/or the relative stroke lengths required for unblocking the venting ports of the two fluid chambers so as to establish different critical pressure levels for forward and reverse driving. The inhibiting means could also be a separate valve body mechanically coupled with the switchover piston.

According to another important feature of our invention, the switchover member is mechanically linked with manually operable brake means for quickly restoring that member to its normal position against a directive force exerted on it by one of its fluidic or electromagnetic actuating means, e.g. under emergency conditions or when the vehicle carries no sensitive cargo. The term "manual" is not limited to operation by hand; in fact, the embodiment specifically described hereinafter utilizes a spring-loaded pedal as an operating element. This operating element is connected with the switchover member via an articulated linkage having a nonlinear transmission ratio for facilitating fine speed control in the vicinity of the normal position of that member at speeds below the critical level.

BRIEF DESCRIPTION OF THE DRAWING

The above and other features of our invention will now be described in detail with reference to the accompanying drawing in which.

SPECIFIC DESCRIPTION

Figure 1:
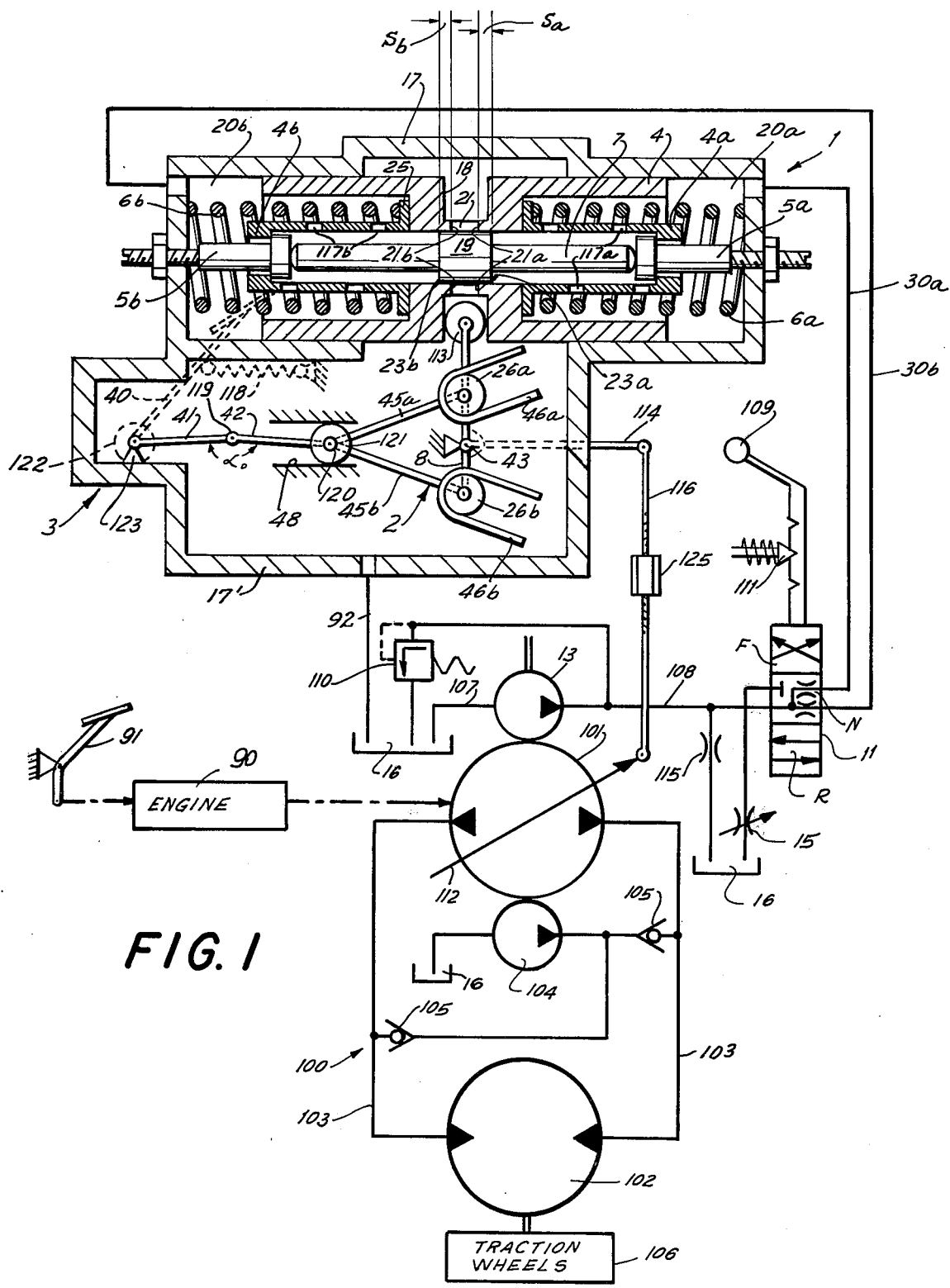
FIG. 1 is a somewhat diagrammatic overall view of a hydrostatic transmission provided with a hydraulic control system according to our invention, parts of that system having been illustrated in section.

In FIG. 1 we have shown an automatic engine 90 driving a main pump 101 of a hydrostatic transmission generally designated 100, pump 101 being fluidically linked with a hydrostatic motor 102 via a pair of conduits 103. Transmission 100 also includes the usual replenishing pump 104, likewise driven by engine 90 and connected with conduits 103 via check valves 105, along with nonillustrated ancillary devices such as pressure-limiting valves. Motor 102 is coupled with a load 106 represented by the traction wheels of a forklift truck or similar vehicle, not further illustrated, which is powered by engine 90 under the control of the usual accelerator pedal 91.

Another pump 13, driven by internal-combustion engine 90 directly or by way of pump 101, has an intake 107 drawing oil from a sump 16 and delivering it, under a pressure roughly proportional to the speed of engine 90 (and therefore also related to the position of gas pedal 91), to a supply line 108 terminating at a three-way valve 11 which is manually shiftable with the aid of a selector 109. Line 108 is connected to sump 16 through a pressure-limiting valve 110 in parallel with a throttle 115.

Figure 2:
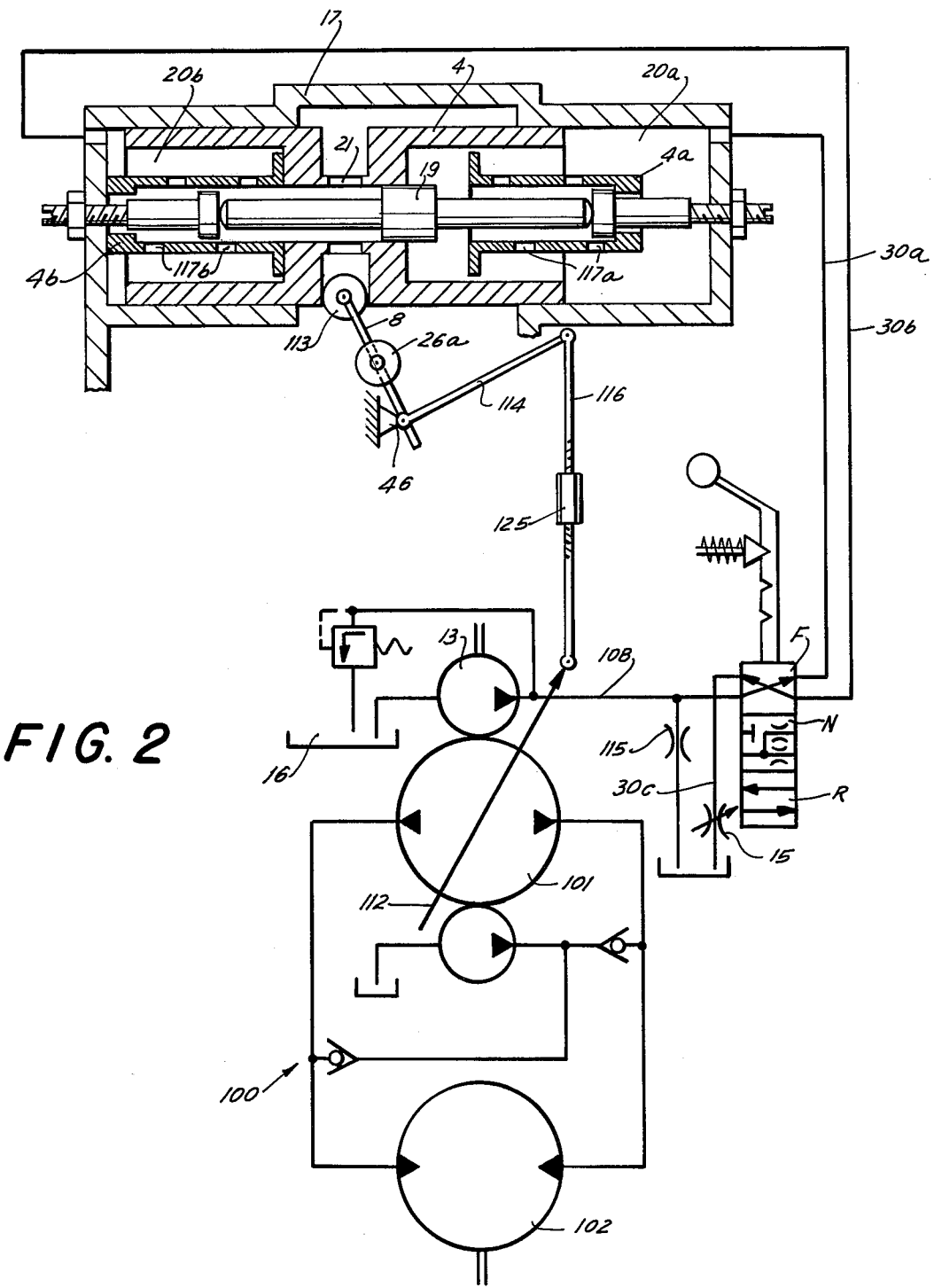
FIGS. 2 and 3 are views similar to FIG. 1, showing part of the control system in alternate positions.
Figure 3:
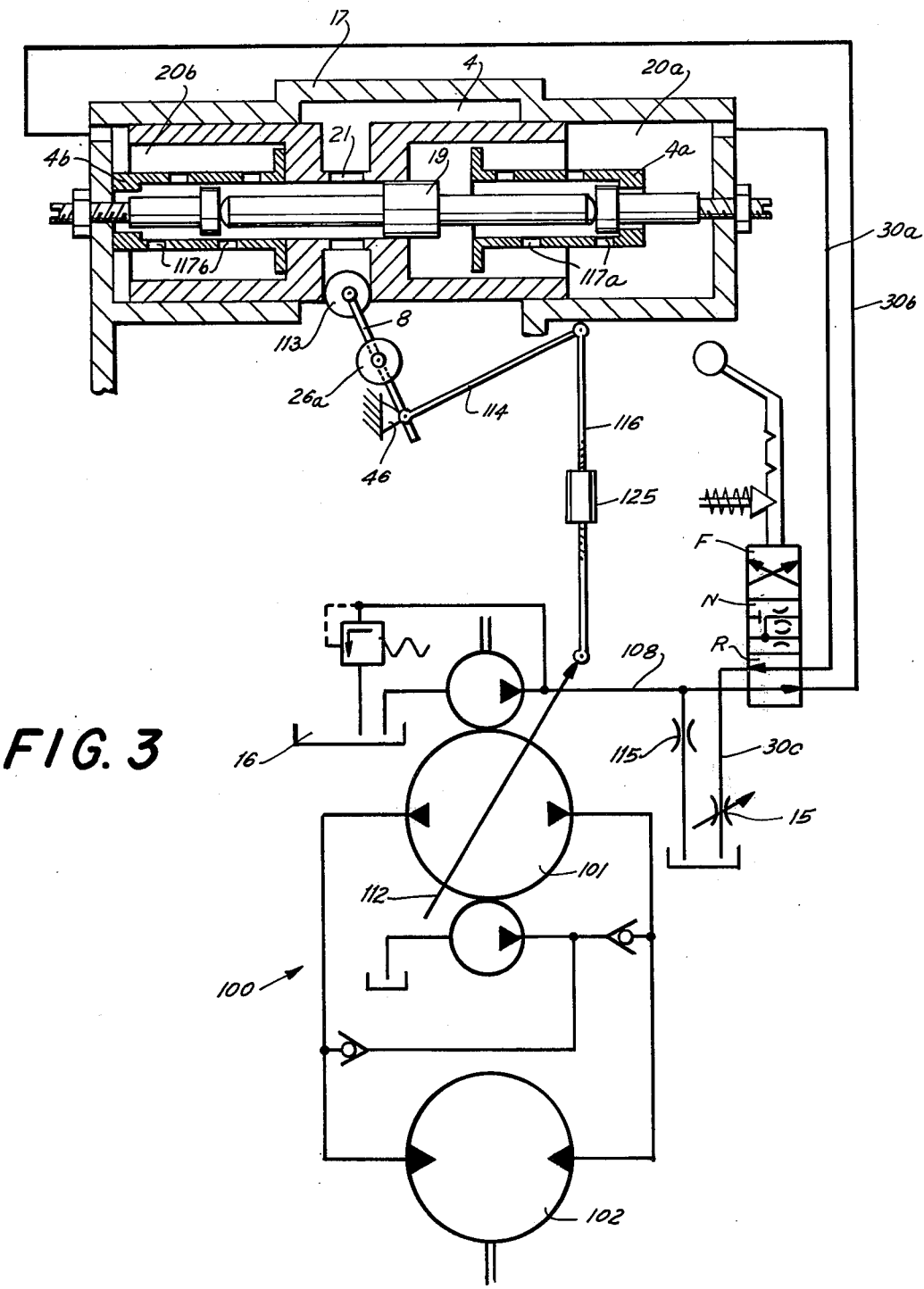

Selector 109 has three positions in which it can be releasably arrested by a spring-loaded detent 111, i.e. a neutral position N shown in FIG. 1 and two working positions F ("forward") and R ("reverse") respectively illustrated in FIGS. 2 and 3. Two branch lines 30a and 30b are pressurized in parallel from supply line 108 in position N. In position F, line 30a communicates with line 108 while line 30b is drained to the sump 16 by way of an adjustable throttle 15; in position R the roles of lines 30a and 30b are reversed.

Hydrostatic pump 101 is provided with a setting lever 112 rigid with its nonillustrated control plate, a swing of this lever serving to alter the intensity and the distribution of the oil pressure in conduits 103 as is well known per se. With the setting shown in FIG. 1, pump 101 transmits zero torque to motor 102 and therefore to load 106. Rotation of lever 112 from this midposition generates a positive or a negative torque entraining the load 106 in a forward or a reverse sense at a speed determined by that of engine 90.

Setting lever 112 is adjustable, under the control of selector 109, by a hydraulic system 1 comprising a cylinder 17 with two fluid chambers 20a and 20b occupied by respective extremities of a piston 4. This piston, serving as a switchover member, is positively connected with setting lever 112 by a mechanical coupling 2 which includes a roller 113 engaging in a radial groove 18 of the piston, the roller being carried on a lever 8 having a fixed fulcrum 43. Lever 8 is rigid with an arm 114 articulated by way of a rod 116 to lever 112. The normal piston position shown in FIG. 1 coincides with the zero-torque midposition of lever 112.

Piston 4 is biased into this normal position by a pair of compression springs 6a and 6b lodged in respective spring housings 4a and 4b within the hollow extremities of the piston extending into chambers 20a and 20b, the positions of the spring housings being adjustable with the aid of stops 5a and 5b threaded into opposite sidewalls of cylinder 17. These two sidewalls are provided with respective inlet ports connected to branch lines 30a and 30b whereby hydraulic fluid from pump 13 is admitted to chamber 20a in selector position F and to chamber 20b in selector position R under a pressure varying with the speed of engine 90. In the illustrated position of stops 5a and 5b, spring housings 4a and 4b just touch a central partition of piston 4 and are prevented from moving further toward the middle of the cylinder so that an excursion of the piston to either side of its normal position is resisted by one of the springs without being assisted by the other. A stationary elongate insert 7, extending axially within piston 4, is immobilized by the two stops and is provided with a central valve head 19 aligned with groove 18, that groove communicating with the interior of the piston by several ports 21 normally blocked by the head 19. Opposite edges 21a and 21b of each port 21 are separated from adjoining faces 23a and 23b of valve head 19 by identical distances $s_a$ and $s_b$ in the illustrated normal piston position.

If pressure in line 30a and chamber 20a is sufficient to drive the piston 4 to the left with a stroke exceeding the distance $s_b$, against the resistance of spring 6b, chamber 20b is vented to an extension 17' of cylinder 17, communicating through a line 92 with the sump 16, via orifices 117b in spring housing 4b and the gap existing between lands 21b and 23b. At engine speeds generating such a fluid pressure, as illustrated in FIG. 2, any oil admitted to chamber 20b will therefore be immediately drained off so that no significant fluid pressure can build up therein. A sudden reversal of selector 109 from position F to position R, as shown in FIG. 3, will then cut off the flow of hydraulic fluid into chamber 20a and connect that chamber via line 30a and throttle 15 with sump 16 so that fluid pressure in chamber 20a will gradually diminish as the oil leaks off at a rate determined by the adjustable width of the throttle. When the restoring force of spring 6b has returned the piston 4 close enough to normal to reblock the aforedescribed drainage path, oil pressure from line 30b can begin to accumulate in chamber 20b and to accelerate the piston past its normal position into an off-normal position to the right thereof. If the engine speed at this point is still high enough to make the piston stroke larger than distance $s_a$, the now depressurized chamber 20a will be vented to the sump 16 by way of orifices 117a in spring housing 4a and the gap developing between lands 21a and 23a as the ports 21 of piston 4 move past the valve head 19 of insert 7 and clear its face 23a.

FIGS. 2 and 3 show the piston 4 in its extreme left-hand position as determined by the length of spring housing 4b. Similarly, the length of spring housing 4a establishes a limiting right-hand position for the piston. Readjustment of the stops 5a and 5b, with maintenance of their original axial separation corresponding to the length of insert 7, shifts the normal piston position to either the left or the right so that more fluid pressure will be needed to cover, say, the distance $s_a$ than the distance $s_b$. In this way the critical speed level, beyond which an instant course reversal is inhibited, may be made higher for forward driving than for reverse driving, for example.

The extensions of branch lines 30a and 30b within the central section of valve body 11, aligned therewith in position N, are shown to be constricted to prevent a rapid draining of fluid chamber 20a in the position of FIG. 2 (or of fluid chamber 20b in a position symmetrical thereto) upon a shifting of selector 109 from working position F (or R) to neutral position N. This results in a gradual depressurization of the hitherto active chamber 20a (or 20b), possibly assisted by a deceleration of engine 90, as the opposing spring 6b (or 6a) represses the piston 4 toward its normal position. Upon closure of the drainage path, i.e. with reblocking of ports 21 by valve head 19 as the piston approaches that normal position, some fluid pressure will also develop in the previously drained chamber 20b (or 20a). On standstill (FIG. 1) the pressures in chambers 20a and 20b are completely in balance for any engine speed.

Figure 4:
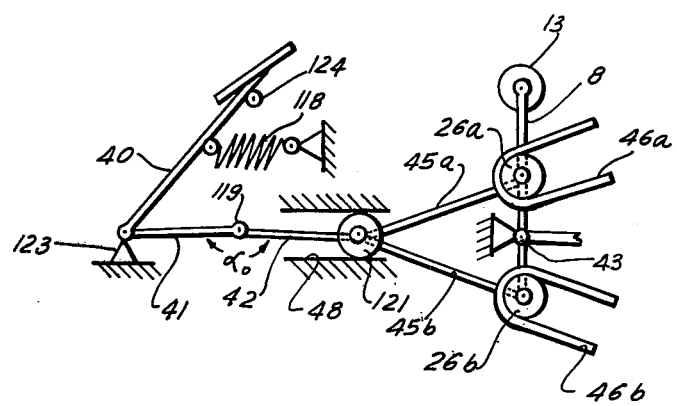
FIGS. 4 and 5 are two somewhat diagrammatic views showing different positions of a brake mechanism forming part of the system of FIG. 1.

Situations may arise when a rapid deceleration of the vehicle from speeds above the critical limit is desired. For this purpose we provide, within cylinder extension 17', a brake mechanism 3 designed to override the inhibiting means constituted, in the embodiment of FIGS. 1 - 3, by lands 21a, 21b and 23a, 23b through which the inactive fluid chamber is drained to the sump 16. Brake mechanism 3 comprises a pedal 40, held by a tension spring 118 against a stop 124 (FIGS. 4 and 5), which is rigid with an arm 41 of a coupling 2 forming an articulated linkage with another arm 42 hinged to it at 119. Arm 42 ends in a shaft 120 of a roller 121 which is linearly guided by a track 48; shaft 120 forms a pivotal axis for a pair of branch arms 45a and 45b which are independently swingable thereon and terminate in bifurcations 46a and 46b forming guide tracks for respective rollers 26a and 26b carried on lever 8 at opposite sides of its fulcrum 43. Pedal 40, located outside housing 17', has a shaft 122 journaled in bearings 123 and disposed partly within the housing for connection with linkage 41, 42.

In the normal position of piston 4, shown in FIG. 1, lever 8 is perpendicular to the guide track 48 (see also FIG. 4) and arms 41, 42 are more or less aligned, including with each other an angle $\alpha_0$ of about 175°.

Figure 5:
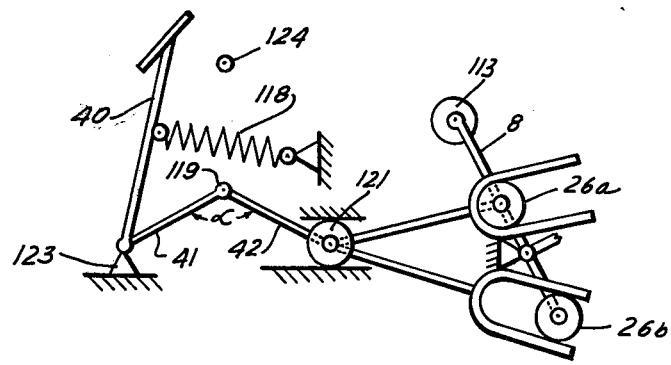

If piston 4 shifts to one side or the other, e.g. to the left as shown in FIGS. 2, 3 and 5, lever 8 is inclined so that roller 26a (or 26b if the piston excursion is to the right) thrusts the guide roller 121 to the left via arm 45a (or 45b) whereby linkage 41, 42 is forced to buckle about hinge joint 119, with corresponding reduction of the angle $\alpha$ included between arms 41 and 42. Pedal 40 now swings counterclockwise about its fulcrum 123, against the force of spring 118 which is weak in comparison with biasing springs 20a and 20b so as not materially to affect the aforedescribed operations. Brake pedal 40 remains in this swung-out position as long as piston 4 is off normal, the extent of the swing of the pedal from the position of FIGS. 1 and 4 being roughly proportional to the vehicle speed.

If the driver wishes to decelerate the vehicle, he steps on the pedal 40 and thereby entrains the piston 4 toward its normal position through the intermediary of brake mechanism 3 and coupling 2. When the pedal 40 hits the stop 124, setting lever 112 of pump 101 (FIG. 1) is again centered and the vehicle is arrested.

As long as selector 109 is in either of its working positions F, R, the driver may use the brake pedal 40 to operate the vehicle at crawl speeds by allowing the oil pressure in chamber 20a or 20b to displace the piston 4 by a small distance from its normal position, with a corresponding small separation of the pedal from its stop 124. From the geometry of the articulated linkage 41, 42 it will be apparent that the transmission ratio between the pedal and the lever 8 is nonlinear, a given incremental swing of the pedal resulting in a progressively decreasing skiing angle of the lever as the pedal approaches its stop. This facilitates a very precise speed control at near-zero vehicular velocities, resulting in high maneuverability of the vehicle especially during loading and unloading.

The assembly 2, 3 has been omitted in FIGS. 2, 3 and 6 - 8 for the sake of clarity.

Figure 6:
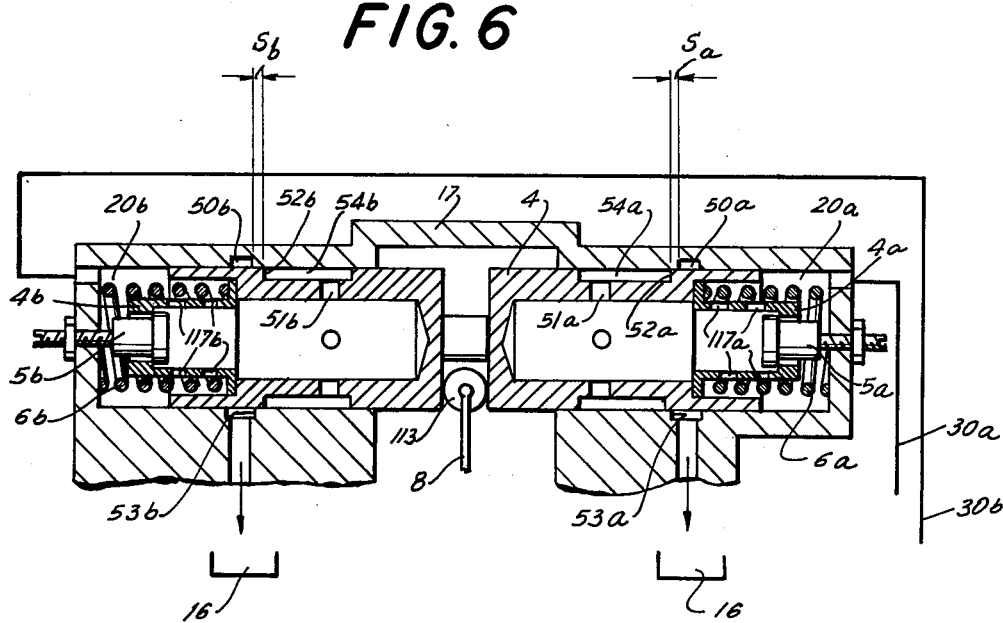
FIGS. 6 and 7 are sectional views showing certain modifications of the hydraulic control system of FIGS. 1 – 3.

In FIG. 6 we have shown a modified hydraulic control system in which the valve member 7 of FIGS. 1 - 3 has been replaced by fluid channels on the inner wall of cylinder 17 coacting with associated lands on piston 4. These channels comprise a pair of annular grooves 50a, 50b in the cylinder wall, communicating with the sump 16, and peripheral recesses 54a, 54b on piston 4 which are respectively connected with fluid chambers 20a and 20b by way of ports 51a, 51b in the piston wall and orifices 117a, 117b in spring housings 4a, 4b. In the illustrated normal piston position, edges 52a, 52b of recesses 54a, 54b are axially separated from edges 53a, 53b of grooves 50a, 50b by distances $s_a$, $s_b$, respectively. Thus, a leftward shift of piston 4 by a stroke exceeding distance $s_b$ again establishes a drainage path for chamber 20b whereas a rightward shift beyond distance $s_a$ opens a similar path for chamber 20a. Stops 5a and 5b can be adjusted to alter not only the biasing forces of springs 6a and 6b, acting upon the piston 4 in the normal position, but also the critical distances $s_a$ and $s_b$. The operation of the system of FIG. 6 is otherwise identical with that of FIGS. 1 - 3.

Figure 7:
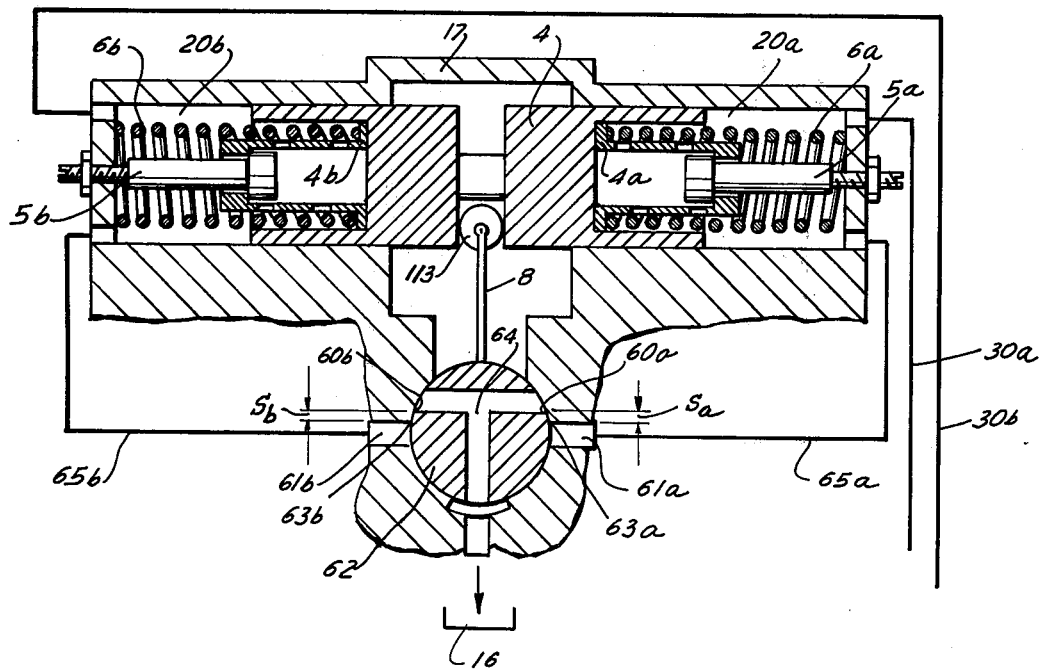

In FIG. 7 we have shown the piston 4 coupled, via roller 113 and lever 8, with a rotatable valve body 62 having a T-shaped channel 64 in communication with drain 16. Ports 61a and 61b, flanking the valve body 62, communicate by way of respective fluid lines 65a, 65b with chambers 20a and 20b but are normally cut off from channel 64. The critical distances $s_a$ and $s_b$ are here measured between edges 60a, 60b of channel 64 and edges 63a, 63b of ports 61a, 61b. In this case, too, adjustment of the positions of spring housings 4a, 4b with the aid of stops 5a, 5b allows these distances $s_a$ and $s_b$ to be varied in the normal piston position.

Figure 8:
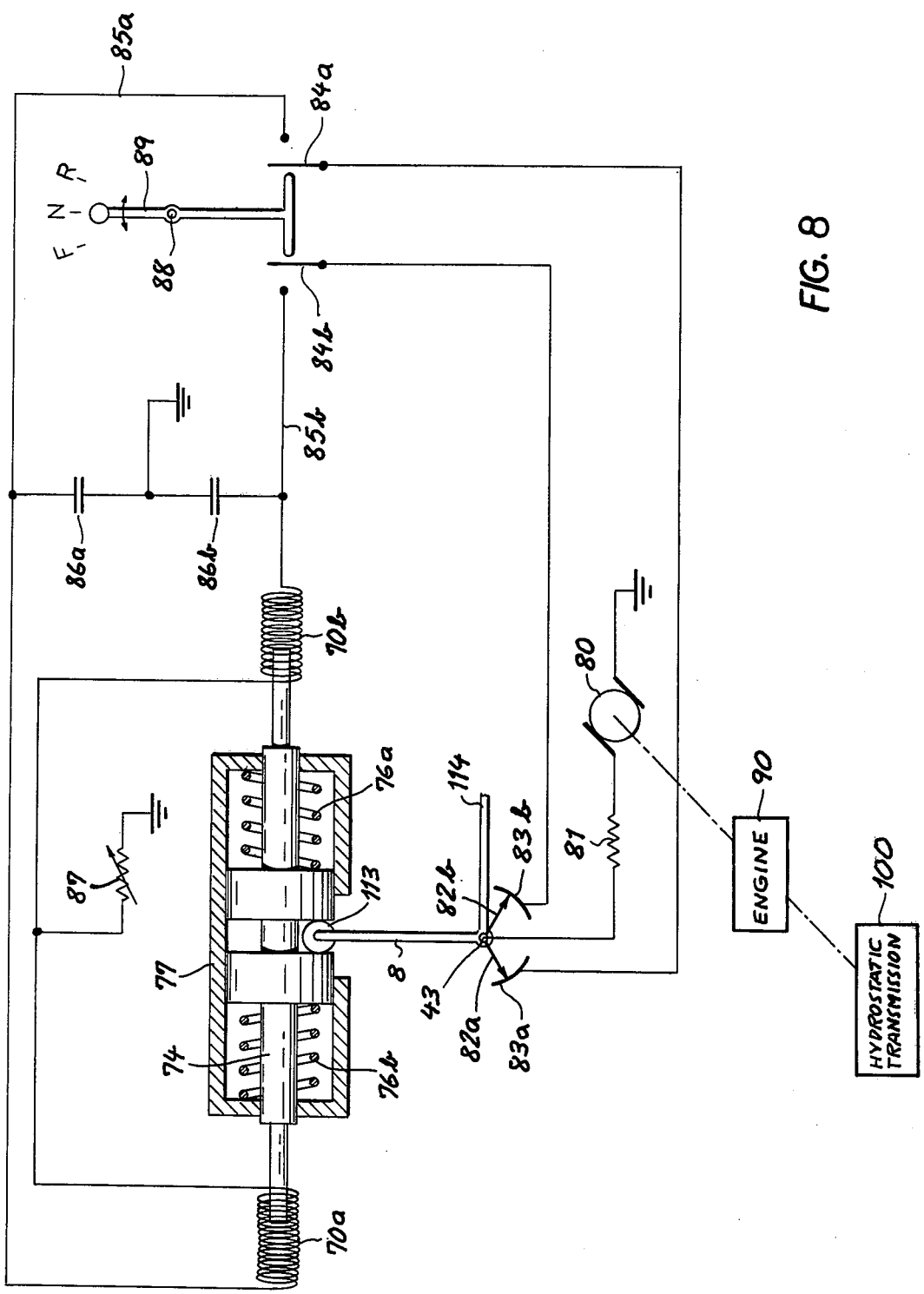
FIG. 8 is a diagrammatic view of another embodiment comprising an electromagnetic control system.

FIG. 8 illustrates an electromagnetic control system generally equivalent to the hydraulic systems of the preceding Figures. Piston 4 has here been replaced by a magnetic armature 74 loaded by biasing springs 76a, 76b within a housing 77. Armature 74 has a pair of extremities constituting the cores of respective solenoid windings 70a and 70b connected in parallel across a direct-current generator 80 driven by engine 90. The energizing circuit of solenoid 70a includes a contact arm 82a on lever 8, a coacting arcuate bank contact 83a and a normally open switch 84a whose closure applies voltage to a lead 85a. Analogously, the energizing circuit of solenoid 70b includes a contact arm 82b on lever 8, a coacting arcuate bank contact 83b, a normally open switch 84b and a lead 85b. A fixed resistor 81, inserted between the high-voltage output of generator 80 and a junction of contact arms 82a, 82b, and an adjustable resistor 87, inserted between ground and leads 85a, 85b, are common to both circuits. Two capacitors 86a and 86b, lying between ground and leads 85a, 85b, form part of a pair of delay networks also including the common resistor 87.

A selector lever 89, fulcrumed at 88, is manually displaceable between the three aforedescribed positions N, F and R. In position F, lever 88 closes the switch 84a so as to energize the solenoid 70a whereby armature 74 is pulled to the left, causing a counterclockwise swing of lever 8 and a corresponding rotation of lever 112 (cf. FIG. 2). With the output voltage of generator 80 roughly proportional to engine speed, contact arm 82b in the energizing circuit of the opposite solenoid 70b remains engaged with the associated bank contact 83b until the critical level is exceeded. Thereafter, the latter circuit cannot be closed immediately upon a change of selector 89 to its alternate working position R. As the energization of the now open-circuited solenoid 70a gradually decreases, in dependence upon the time constant of delay network 86a, 87, spring 76b begins to restore the armature 74 to its normal position (this would also be the case if selector 89 had been moved to its neutral position N). As soon as bank contact 83b is re-engaged by arm 82b, solenoid 70b is energized and accelerates the switchover of armature 74 and lever 8.

The positions of contact elements 82a, 82b and 83a, 83b could be made adjustable to vary the critical distances which the armature 74 must travel before opening the energizing circuit of the currently unoperated solenoid.

The time constants of the delay networks in the system of FIG. 8 can be altered with the aid of the adjustable resistor 87 whose function is thus analogous to that of throttle 15 (FIGS. 1 - 3).

The coupling between switchover member 4 or 74 and setting lever 112 should also be adjustable for the purpose of precisely correlating the zero-torque position of the setting lever with the normal position of the switchover member, especially upon a change in that normal position as described above. This may be accomplished with the aid of a turnbuckle 125 engaging two oppositely threaded portions of rod 116.

Although the biasing means for the switchover members have been shown only as springs, other devices such as gas cushions or resilient pads can be used for this purpose.

Pump 13, which of course will not be needed in the electrical system of FIG. 8, may be replaced by a blower in the systems of FIGS. 1 - 7 for pneumatic instead of hydraulic operation.

We claim:

1. In a hydrostatic transmission including an engine-driven hydrostatic pump, a hydrostatic motor coupled with a load and fluidically linked with said hydrostatic pump, and setting means on said pump for varying the magnitude and sign of a torque fluidically transmitted to said hydrostatic motor, the combination therewith of:
    a switchover member mechanically linked with said setting means, said switchover member having a normal position coinciding with zero torque and being shiftable to either side of said normal position for transmitting a torque of a corresponding sign to said hydrostatic motor;
    biasing means urging said switchover member into said normal position;
    normally de-energized first actuating means operatively coupled with said switchover member for exerting thereon a directive force displacing said switchover member to one side from said normal position with resulting rotation of said hydrostatic motor in a first direction;
    normally de-energized second actuating means operatively coupled with said switchover member for exerting thereon a directive force displacing said switchover member to the opposite side from said normal position with resulting rotation of said hydrostatic motor in a second direction;
    selector means with a neutral position and with two working positions for respectively connecting said first and second actuating means to an energy source; and
    inhibiting means effective upon displacement of said switchover member by a predetermined minimum distance from said normal position by one of said actuating means for preventing energization of the other of said actuating means whereby a change in sign of said torque upon a subsequent changeover of said selector means from one working position to the other can occur only after a reverse displacement of said switchover member by said biasing means.

2. The combination defined in claim 1 wherein said load comprises a traction wheel of a vehicle, said energy source being linked with said hydrostatic pump for displacing said switchover member to an extent generally proportional to vehicle speed whereby said minimum distance corresponds to a predetermined speed level.

3. The combination defined in claim 2 wherein said energy source is part of a supply circuit including delay means lying in series with the actuating means energized in a working position of said selector means for maintaining a gradually diminishing energization of said actuating means upon a changeover of said selector means to the other working position.

4. The combination defined in claim 3 wherein said energy source is a generator of fluid pressure, said delay means comprising an adjustable throttle.

5. The combination defined in claim 4 wherein said switchover member is a spring-loaded piston in a cylinder, said first and second actuating means comprising respective fluid chambers in said cylinder connectable to said generator in respective working positions of said selector means, said fluid chambers being provided with normally blocked venting ports, said inhibiting means comprising valve means for unblocking a venting port of a fluid chamber cut off from said generator by said selector means in a working position thereof.

6. The combination defined in claim 5 wherein said cylinder is provided with adjusting means for shifting the normal position of said piston against the spring pressure acting thereon.

7. The combination defined in claim 5 wherein said valve means comprises a stationary insert in said cylinder coacting with said piston.

8. The combination defined in claim 5 wherein said valve means comprises coacting lands on said piston and said cylinder.

9. The combination defined in claim 5 wherein said valve means comprises a rotatable body mechanically linked with said piston.

10. The combination defined in claim 2, further comprising manually operable brake means mechanically linked with said switchover member for quickly restoring same to said normal position against a directive force from one of said actuating means.

11. The combination defined in claim 10 wherein said brake means comprises an operating element and an articulated linkage between said operating element and said switchover member having a nonlinear transmission ratio for facilitating fine speed control in the vicinity of said normal position at speeds insufficient to make said inhibiting means effective.

12. The combination defined in claim 11 wherein said operating element is a spring-loaded pedal, said brake means further comprising a lever with a fixed fulcrum engaging said switchover member, said articulated linkage being tied to said pedal and terminating in a pair of branch arms bearing upon said lever at points on opposite sides of said fulcrum.

* * * * *